3,047,585
SYNTHESIS OF 3-INDOLEALKANOIC ACIDS
Herbert E. Johnson, South Charleston, W. Va., assignor to Union Carbide Corporation, a corporation of New York
No Drawing. Filed Oct. 28, 1960, Ser. No. 65,590
6 Claims. (Cl. 260—319)

This invention relates to an improved process for the preparation of 3-indolealkanoic acids. More particularly, this invention relates to the preparation of alkali metal salts of 3-indolealkanoic acids by reacting a hydroxy acid with indole in the presence of an alkali metal hydroxide and the subsequent conversion of the alkali metal salt to the corresponding 3-indolealkanoic acid.

The acids that can be prepared by the process of this invention are represented by the following structural formula:

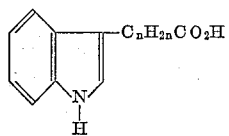

wherein $n$ is an integer from 1 to about 10. Illustrations of such acids are the unsubstituted 3-indolealkanoic acids such as 3-indoleacetic acid, alpha-(3-indolyl)propionic acid, beta-(3-indolyl)-propionic acid, gamma-(3-indolyl)-butyric acid, delta-(3-indolyl)valeric acid, 2-(3′-indolyl)-3-ethylpentanoic acid, epsilon-(3-indolyl)caproic acid, and the like.

Acids of the type shown above can be used as intermediates in the preparation of biologically active compounds. For example, beta-(3-indolyl)propionic acid can be used to prepare lysergic acid, useful as a pharmaceutical. The 3-indolealkanoic acids are also useful as plant growth regulators. For example, both 3-indoleacetic acid and gamma-(3-indolyl)butyric acid have been shown to affect the rooting of certain varieties of potato, sugar cane, carrots and grape vines. Epsilon-(3-indolyl)-caproic acid has been shown to have an activity similar to that of gamma-(3-indolyl)butyric acid while beta-(3-indolyl)propionic acid, delta-(3-indolyl)valeric acid and zeta-(3-indolyl)heptanoic acid have also exhibited activity in this field.

Until the present invention, indolealkanoic acids, particularly those having carbon chains containing 4 or more carbon atoms exclusive of the carboxyl group, have, as a group, been extremely difficult to synthesize. For example, the Fischer indole synthesis, which is the most common method known for the preparation of 3-indolealkanoic acids, involves a number of operations and requires starting materials that are difficult to prepare.

I have now discovered that alkali metal salts of 3-indolealkanoic acids can be prepared by a simple one-step process which uses readily available starting materials, which salts are readily converted to the corresponding 3-indolealkanoic acids. My process is generally applicable to the preparation of a large class of 3-indolealkanoic acids, and is not restricted to only a single acid or to a narrow group of acids. Furthermore, yields of 3-indolealkanoic acids of over 92 percent, and efficiencies of up to about 100 percent, based upon the indole employed, can be achieved in accordance with my process.

The process of the present invention essentially comprises reacting indole with a hydroxy acid in the presence of an alkali metal hydroxide, thereafter acidifying the reaction mixture and recovering the resulting 3-indolealkanoic acid. This process can be illustrated by the following schematic equation:

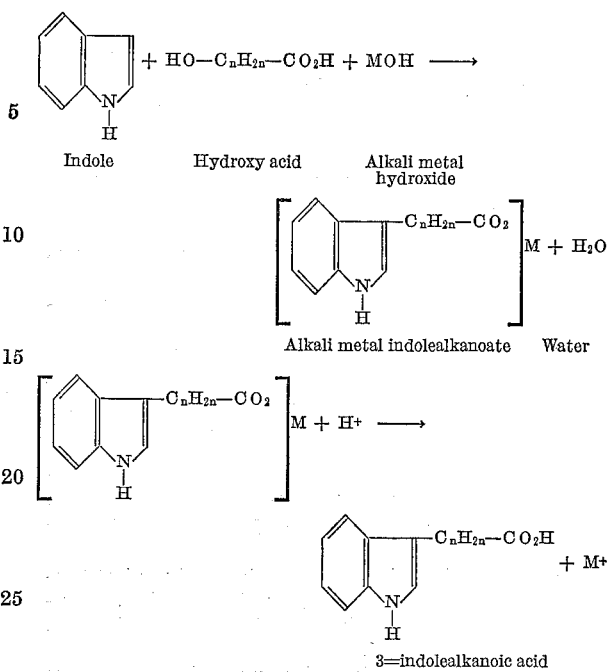

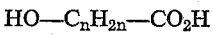

3=indolealkanoic acid

Hydroxy acids that can be employed in the process of this invention can be represented by the following structural formula:

$$HO—C_nH_{2n}—CO_2H$$

wherein $n$ is an integer having a value of at least 1. Preferred acids are those wherein $n$ has a value of from 1 to about 10.

Illustrative of such hydroxy acids are glycolic acid, 2-hydroxypropionic acid (lactic acid), 3-hydroxypropionic acid, 2-hydroxybutyric acid, 3-hydroxybutyric acid, 4-hydroxybutyric acid, 2-hydroxy-2-methylpropionic acid, 3-hydroxy-2-methylpropionic acid, 2-hydroxypentanoic acid, 3-hydroxypentanoic acid, 4-hydroxypentanoic acid, 5-hydroxypentanoic acid, 2-hydroxy-2-methylbutyric acid, 3-hydroxy-2-methylbutyric acid, 4-hydroxy-2-methylbutyric acid, 2-hydroxy-3-methylbutyric acid, 3-hydroxy-3-methylbutyric acid, 4-hydroxy-3-methylbutyric acid, 3-hydroxy-2,2-dimethylpropionic acid, 2-hydroxyhexanoic acid, 3-hydroxyhexanoic acid, 4-hydroxyhexanoic acid, 5-hydroxyhexanoic acid, 6-hydroxyhexanoic acid, 2-hydroxy-2-methylpentanoic acid, 3-hydroxy-2-methylpentanoic acid, 4-hydroxy-2-methylpentanoic acid, 5-hydroxy-2-methylpentanoic acid, 2-hydroxy-3-methylpentanoic acid, 3-hydroxy-3-methylpentanoic acid, 4-hydroxy-3-methylpentanoic acid, 5-hydroxy-3-methylpentanoic acid, 2-hydroxy-4-methylpentanoic acid, 3-hydroxy-4-methylpentanoic acid, 4-hydroxy-4-methylpentanoic acid, 5-hydroxy-4-methylpentanoic acid, 2-hydroxymethylpentanoic acid, 3-hydroxymethylpentanoic acid, 4-hydroxymethylpentanoic acid, 2-hydroxy-2-ethylbutyric acid, 3-hydroxy-2-ethylbutyric acid, 4-hydroxy-2-ethylbutyric acid, alpha-(1-hydroxymethyl)butyric acid, alpha-(2-hydroxyethyl)butyric acid, 2-hydroxy-2,3-dimethylbutyric acid, 3-hydroxy-2,3-dimethylbutyric acid, 4-hydroxy-2,3-dimethylbutyric acid, 2-methyl-3-hydroxymethylbutyric acid, 2-hydroxymethyl-3-methylbutyric acid, 2-hydroxymethyl-2-methylbutyric acid, 3-hydroxy-2,2-dimethylbutyric acid, 4-hydroxy-2,2-dimethylbutyric acid, 2-hydroxy-3,3-dimethylbutyric acid, 4-hydroxy-3,3-dimethylbutyric acid, the hydroxyheptanoic acids, the hydroxyoctanoic acids, the hydroxynonanoic acids, the hydroxydecanoic acids, and the like.

Any alkali metal hydroxide can be employed in the process of this invention, such as sodium hydroxide, potassium hydroxide, lithium hydroxide, rubidium hydroxide, cesium hydroxide, and the like. Alkaline earth metal hydroxides, such as calcium, barium and the like, can also be employed. However, the use of the alkali metal hydroxides is preferred. Molar ratios of from about 1 to about 1.5 moles of alkali metal hydroxide per mole of hydroxy acid can be employed. Greater amounts of alkali metal hydroxide can be employed but afford no particular advantages. Less than an equimolar ratio, however, reduces the yield of 3-indolealkanoic acid. A ratio of about 1.1 moles of alkali metal hydroxide per mole of hydroxy acid is preferred.

The amount of hydroxy acid compound employed in the initial reaction mixture is such that the molar ratio of the hydroxy acid to indole is from about 1.5:1 to about 1:1.5. Higher or lower ratios can be employed but are not necessary, since an excess of either reactant provides no particular advantages. Accordingly, equimolar ratios of hydroxy acid to indole are preferred.

The process of this invention can be conducted in the presence of water in an amount up to about 20 weight percent of the initial reaction mixture without impairing the yields of the 3-indolealkanoic acids. When water is present in greater amounts the yields of 3-indolealkanoic acids are reduced.

The process of this invention can be conducted at temperatures of from about 150° C. to about 350° C. Temperatures in the range of from 220° C. to about 300° C. are preferably employed.

The reaction time is dependent upon the temperature at which the reaction is conducted, less time being required to attain the same degree of conversion of indole to 3-indolealkanoic acid at high temperatures than at low temperatures. In general, reaction times of 0.5 or less to 24 hours or more can be employed.

The 3-indolealkanoic acid can be recovered from the reaction mixture by dissolving the alkali metal 3-indolealkanoate in water, employing generally from about 10 to about 500 or more moles of water per mole of alkali metal 3-indolealkanoate, removing any unreacted indole compound or other undissolved material by filtration, centrifugation or other suitable means and acidifying the remaining aqueous solution to a pH of from about 1 to about 6. Acids which can be employed are mineral acids, such as hydrobromic acid, hydrochloric acid, chloric acid, perchloric acid, nitric acid, sulfuric acid, phosphoric acid, and the like, and organic acids, such as formic acid, acetic acid, chloroacetic acid, propionic acid and the like. The precipitated 3-indolealkanoic acid that results from the acidification can then be removed from the aqueous mixture by conventional methods, such as by filtration, centrifugation and the like, after which the indolealkanoic acid can be water-washed and dried at a temperature of from about ambient temperature to about 150° C.

The 3-indolealkanoic acid can also be recovered from the reaction mixture by the use of solvent extraction procedures. This method comprises slurrying the reaction mixture in water and contacting the resulting aqueous mixture with an organic solvent for the indole, which solvent is immiscible with water. Suitable solvents include, for example, aromatic hydrocarbons, such as benzene, toluene, xylene, ethylbenzene, alkylnaphthalenes, tetralin and the like, ethers such as isopropyl ether, aliphatic and alicyclic hydrocarbons, such as hexane, cyclohexane, heptane, and the like, as well as certain halogenated solvents, such as chloroform and carbon tetrachloride. In general, the volumetric ratio of organic solvent to aqueous solution is from about 1:10 to about 10:1, although higher and lower ratios can be employed. The extraction can be effected by contacting the reaction mixture with an agitated mixture of water and the organic solvent, or by first dissolving the reaction mixture in water and then extracting the aqueous solution with the organic solvent.

The extraction can be conducted batchwise or continuously, according to conventional extraction procedures. After extraction, the organic phase can be distilled to strip off the solvent, recovering the indole as a bottoms product which can be recycled to the reaction if desired. The aqueous phase, containing the alkali metal 3-indolealkanoate, is then acidified and the 3-indolealkanoic acid is recovered by employing procedures similar to those previously described.

A preferred embodiment of the process of this invention comprises reacting an indole, a hydroxy acid compound and potassium hydroxide in molar ratios of about 1 mole of indole to from about 1 to about 1.1 moles of hydroxy acid and from about 1.1 to about 1.5 moles of potassium hydroxide at a temperature of from about 240° C. to about 270° C. for from about fifteen to about twenty hours. The reaction mixture is then cooled to about 100° C. and mixed with from about 50 to about 200 moles of water per mole of alkali metal 3-indolealkanoate and is then extracted with isopropyl ether. The isopropyl ether extract is separated from the aqueous raffinate and is distilled to strip off the isopropyl ether. The indole remaining is recycled to the reaction. The aqueous raffinate is acidified with hydrochloric acid to a pH of about 1 to precipitate the 3-indolealkanoic acid, which is filtered out of the aqueous mixture, washed with water and oven-dried.

Another procedure that can be employed is to conduct the above-described process in the presence of from about 1 to 2 moles of a solvent for the indole per mole of indole charged to the reaction. The solvent employed should be inert at the reaction conditions and should be immiscible with water. Solvents containing hydroxyl groups, such as the alcohols, are to be avoided, because they will react with the indole, forming undesirable side products.

Applicable solvents include aliphatic hydrocarbons, such as octane, nonane, and the like, aromatic hydrocarbons, such as tetralin, alkylbenzenes, alkyl naphthalenes and the like, and alicyclic hydrocarbons such as decahydronaphthalene and the like. After completion of the reaction, the reaction mixture is extracted with water to remove the potassium 3-indolealkanoate and the solvent, containing unreacted indole, can be recycled to the reaction. The 3-indolealkanoic acid is recovered from the aqueous extracts, according to the procedures previously described.

The following examples are illustrative of the process of this invention.

Example 1

A three-liter, stainless steel autoclave was charged with 234 grams (2.0 moles) of indole, 240 grams of an aqueous 70 percent glycolic acid solution (2.2 moles of glycolic acid) and 180 grams of potassium hydroxide pellets (2.7 moles of 85% pure potassium hydroxide). The resulting mixture was heated at 250° C. for twenty hours under autogenous pressure. The mixture was then cooled to 30° C., 700 milliliters of isopropanol were added to the auotclave and the resulting mixture was heated at 80° C. to 90° C. for two hours. The mixture was then cooled to ambient temperature, and removed from the autoclave. Crystals of the potassium 3-indoleacetate that had formed were recovered from the reaction mixture by filtration and were dried. A total of 455 grams of the light-yellow, crude potassium indoleacetate was obtained.

Example 2

A one-liter, stainless steel autoclave was charged with 117 grams (1.0 mole) of indole, 84 grams (1.1 moles) of recrystalline glycolic acid and 90 grams of potassium hydroxide pellets (1.3 moles of 85% pure potassium hydroxide). The resulting mixture was heated to a temperature of 250° C. over a period of one and one-half hours and held at that temperature under autogenous pressure for twenty-three hours. The mixture was then cooled to a temperature of 90° C. and dissolved in 500 milliliters of water. The resulting aqueous solution was acidified with concentrated hydrochloric acid to a pH of about 1, whereby crystals of 3-indoleacetic acid were precipitated. The crystals were collected by filtration and dried. A total of 160 grams of light-yellow crystals were obtained that melted at 159° C. to 162° C. with decomposition. These crystals represented a 92 percent yield of 3-indoleacetic acid. A sample of the crude indoleacetic acid that was recrystallized from chloroform melted at 167° C. to 167.5° C. with decomposition. A sample of the recrystallized 3-indoleacetic acid, when mixed with a commercially obtainable sample of 3-indoleacetic acid, did not depress the melting point of the commercial sample. The infrared spectra of the two samples were identical in detail. The melting point of 3-indoleacetic acid has been reported as 164.5° C. to 165° C. [Beil., XXII, 51 (1953)].

*Example 3*

A one-liter, stainless steel autoclave was charged with 117 grams (1.0 mole) of indole, 118 grams of an aqueous 85 percent lactic acid solution (1.1 moles of lactic acid) and 90 grams of potassium hydroxide pellets (1.35 moles of 85% pure potassium hydroxide). The mixture was heated at a temperature of 250° C. for twenty-four hours, cooled to a temperature of 90° C. and then dissolved in 500 milliliters of water. The aqueous solution was then acidified with concentrated hydrochloric acid to a pH of about 1, whereby crystals of alpha-(3-indolyl) propionic acid were precipitated. The crystals weighed 132 grams, which represented a yield of about 70 percent, and melted at 88–97° C. Light yellow crystals melting at a temperature of 105–110° C. were obtained upon two recrystallizations of the crude acid from chloroform. The melting point of alpha-(3-indolyl)propionic acid is reported as 111–112° C. by H. Erdtman and A. Jönsson, Acta Chem. Scand., 8, 119 (1954).

*Example 4*

A 1-liter, stainless steel autoclave was charged with 100 grams (0.85) of indole, 146 grams (1.0 mole) of 2-hydroxy-3-ethylpentanoic acid and 75 grams of potassium hydroxide pellets (1.14 moles of 85% pure potassium hydroxide). The mixture was heated at a temperature of 260° C. for 20 hours. The reaction mixture was then cooled to 90° C. and dissolved in 500 milliliters of water. The aqueous solution was then acidified with concentrated hydrochloric acid to a pH of about 1, whereby 2-(3'-indolyl)-3-ethylpentanoic acid precipitated out. The precipitated acid weighed 22 grams, representing a yield of 9.5 percent. Reddish needles having a melting point of 131–133° C. were obtained after 3 recrystallizations of the crude from cyclohexane.

*Analysis.*—Calculated for $C_{15}H_{19}NO_2$: C, 73.44; H, 7.81; N, 5.71. Found: C, 73.78; H, 7.59; N, 5.77.

What is claimed is:

1. The process for producing a 3-indolealkanoic acid which comprises heating at from 150° C. to 350° C. indole and a hydroxy acid represented by the formula:

$$HO-C_nH_{2n}-CO_2H$$

wherein $n$ is an integer having a value of from 1 to 10 with at least one mole of an alkali metal hydroxide per mole of said hydroxy acid for a period of time sufficient to produce an alkali metal salt of a 3-indolealkanoic acid, and thereafter acidifying the reaction mixture to produce said 3-indolealkanoic acid.

2. The process for producing an alkali metal salt of a 3-indolealkanoic acid which comprises heating at 150° C. to 350° C. indole and a hydroxy acid represented by the formula:

$$HO-C_nH_{2n}-CO_2H$$

wherein $n$ is an integer having a value of from 1 to 10 with at least one mole of an alkali metal hydroxide per mole of said hydroxy acid for a period of time sufficient to produce said alkali metal salt of a 3-indolealkanoic acid.

3. The process of claim 1 wherein the hydroxy acid is an alpha-hydroxy acid.

4. The process of claim 3 wherein said alpha-hydroxy acid is glycolic acid.

5. The process of claim 3 wherein said alpha-hydroxy acid is lactic acid.

6. The process of claim 3 wherein said alpha-hydroxy acid is 2-hydroxy-3-ethylpentanoic acid.

No references cited.